United States Patent Office 2,961,472
Patented Nov. 22, 1960

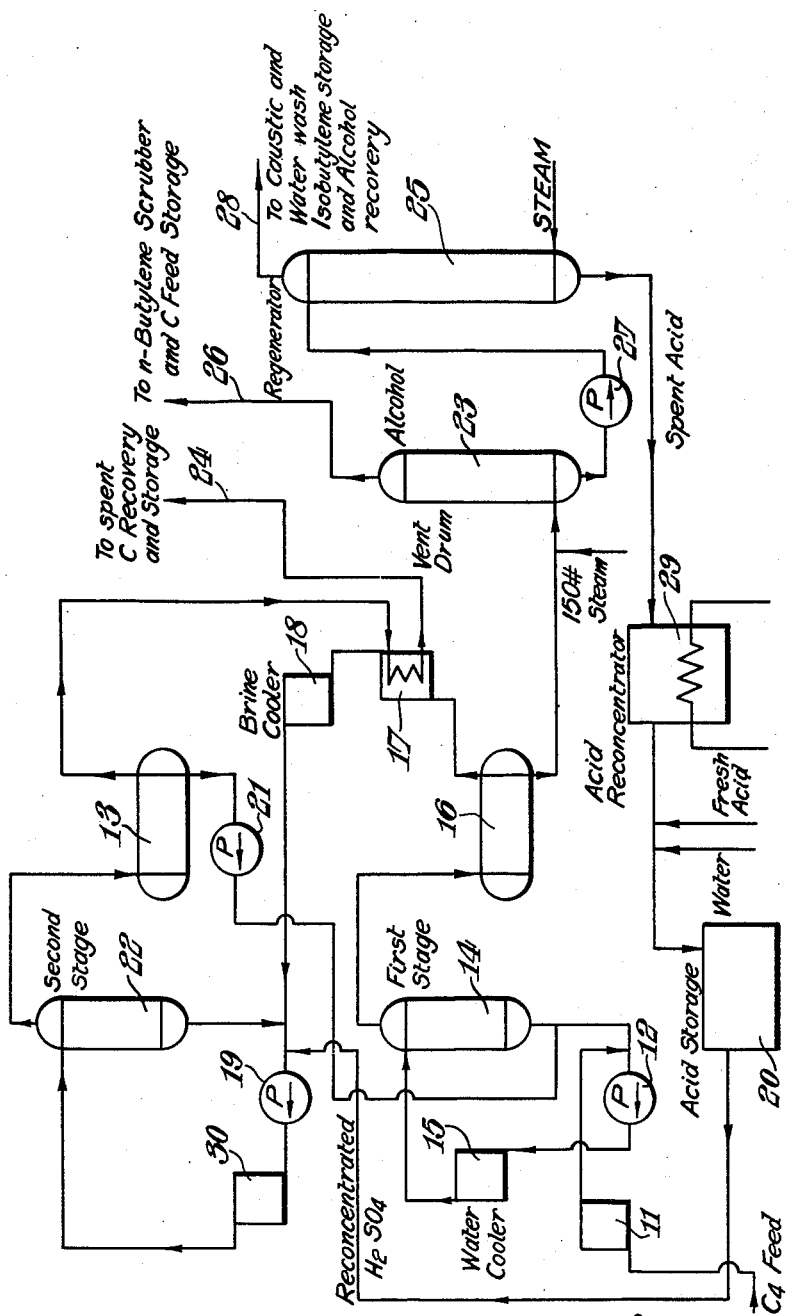

2,961,472

OLEFIN EXTRACTION PROCESS USING VACUUM RECONCENTRATED SULFURIC ACID

Donald Herbert Welch, Lake Charles, La., and Donald David Livingstone and Walter Hayduk, Sarnia, Ontario, Canada, assignors to Polymer Corporation Limited, Sarnia, Ontario, Canada Filed Aug. 1, 1958, Ser. No. 752,524

Claims priority, application Canada Dec. 5, 1957

7 Claims. (Cl. 260—677)

The present invention relates to the selective recovery of isobutylene from mixtures of isobutylene with other $C_4$ hydrocarbons, such as n-butylene and butane, by means of a series of extractions with concentrated aqueous solutions of sulfuric acid. It is more particularly concerned with the recovery of a higher purity isobutylene from the resulting rich sulfuric acid than is normally possible with this type of extraction.

The recovery of high purity isobutylene from a mixture comprising isobutylene and other $C_4$ hydrocarbons, such as, for example n-butylene and butane, is conveniently accomplished by contacting the hydrocarbon mixture with concentrated aqueous solutions of sulfuric acid; a concentration of acid of about 65 percent by weight is normally considered as optimum.

Theoretically the extraction process using concentrated aqueous solutions of sulfuric acid merely consists in the commercial exploitation of the following well-known chemical reaction:

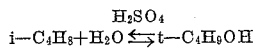

$$i\text{-}C_4H_8 + H_2O \overset{H_2SO_4}{\rightleftharpoons} t\text{-}C_4H_9OH$$

The tertiary butyl alcohol is soluble in sulfuric acid, and so the sulfuric acid phase, containing the dissolved tertiary butyl alcohol, is separated from the hydrocarbon phase. Since the original reaction is reversible and isobutylene is the desired end product, the isobutylene may be recovered by the application of heat to the sulfuric acid solution of the tertiary butyl alcohol.

In spite of the apparent simplicity of this reaction, the commercial application of this phenomena has not been simple. The intrinsic characteristics of isobutylene make maximum recovery of the isobutylene from the sulfuric acid solution of tertiary butyl alcohol incompatable with a high purity of such recovered isobutylene. Hence, a compromise process is carried out in the industrial scale operation.

In order to obtain a clear understanding of the invention, it is necessary that the process as carried out commercially be adequately explained. In the figure of drawings there is illustrated a flow diagram of the process commercially used for the selective recovery of isobutylene from mixtures of isobutylene and other $C_4$ hydrocarbons using, as the extractant, concentrated aqueous sulfuric acid.

The reaction conventionally is a two-stage process, and takes place in first stage reactor 14 and second stage reactor 22. In general, the reaction occurs at a higher temperature in the first stage than in the second stage. Also, the extractant in the first stage is the acid which has already effected some contact with the hydrocarbons in the second stage, known as "partially spent acid," while the acid used in the second stage is fresh concentrated acid. For a clear conception of this process, reference will now be made to the drawing.

The mixed $C_4$ hydrocarbon feed containing the isobutylene is pumped from storage by means of a pump (not shown) through a heat exchanger 11, where it is heated or cooled to the desired temperature. The hydrocarbons are then admitted to the suction side of the first stage emulsion circulating pump 12, where the hydrocarbon is mixed with both "partially spent acid" from the second stage settler tank 13 and recycled emulsion from the bottom of the first stage reactor 14. The so-formed emulsion of sulfuric acid and hydrocarbons including isobutylene is pumped from the discharge side of pump 12 to a heat exchanger, in the form of a water cooler 15 in order to remove the heat of reaction of the sulfuric acid with the isobutylene, and then to the top of the first stage reactor 14. In order to increase the contact time between the sulfuric acid and the hydrocarbon and in order to assure more thorough mixing, a large volume of the sulfuric acid-hydrocarbon emulsion from the bottom of the first stage reactor 14 is recycled back to the suction side of the circulating pump 12. A relatively small stream of the sulfuric acid-hydrocarbon emulsion, wherein the acid, rich in extracted isobutylene in the form of tertiary butyl alcohol, is withdrawn from the first stage reactor 14 and is admitted to the first stage settler drum 16, where the emulsion separates into two phases, an upper hydrocarbon phase, and a lower acid solution phase.

The upper hydrocarbon layer is composed of the hydrocarbons out of which a portion of the isobutylene fraction has been extracted. These partially extracted hydrocarbons pass through a heat exchanger 17 and through a brine cooler 18 to the suction side of the second stage emulsion circulating pump 19. Here, it is contacted with concentrated sulfuric acid. As shown in the figure, this concentrated sulfuric acid is the reconcentrated sulfuric acid flowing from the acid storage tank 20. To this mixture is also added the recycle emulsion of sulfuric acid and hydrocarbon from the bottom of the second stage reactor 22. The mixture then passes through a brine cooler 30 to remove the heat of reaction and then to the top of the second stage reactor 22. As in the first stage reactor, a relatively large volume of the emulsion in reactor 22 is recycled, in order to effect maximum mixing and also to increase contact time. A relatively small volume of the emulsion of sulfuric acid and hydrocarbon, containing sulfuric acid and the isobutylene in the form of tertiary butyl alcohol is drawn off and admitted to the second stage settler drum 13. Here, the emulsion separates into an upper hydrocarbon phase and a lower sulfuric acid solution phase.

The upper hydrocarbon phase in the second stage settler 13 consists mainly of the hydrocarbons from which most of the isobutylene has been removed. This hydrocarbon phase is known as "spent $C_4$ hydrocarbons." The spent $C_4$ hydrocarbons are led through heat exchanger 17, and thence to a recovery and storage system (not shown) through line 24.

The lower sulfuric acid solution phase from second stage settler drum 13 consists mainly of somewhat diluted sulfuric acid and the isobutylene in the form of tertiary butyl alcohol. Such solution is pumped, by means of pump 21 to the recycle stream of the first stage reactor 14, where it is admixed with such recycle stream, as hereinabove described. Eventually, such lower sulfuric acid solution becomes synonymous with the lower sulfuric acid solution in the first stage settler tank 16. This aqueous sulfuric acid solution of tertiary butyl alcohol is known as the "rich extract."

The rich extract leaving the bottom of the first stage settler tank 16 is admixed with 150# steam by injection, and is admitted to the vent drum 23. The vent drum is maintained at about atmospheric pressure. In the vent drum 23, the undesirable but dissolved hydrocarbons and the major portion of the undesirable but entrained hydrocarbons are flashed off in the form of vapours. Together with such undesirable hydrocarbons, some of the tertiary butyl alcohol is regenerated to isobutylene and this isobutylene is also flashed off. Thus, the gaseous hydrocarbons emerging from the vent drum consist of approximately equal parts of butanes, n-butylenes and isobutylene. This gaseous stream is led through line 26 to an n-butylene scrubber (not shown), where it is washed, compressed and condensed, and to a $C_4$ hydrocarbon feed storage (also not shown) from where it is normally recycled to the extraction system at heat exchanger 11. This recycle $C_4$ hydrocarbon stream normally contains about 35% by weight of isobutylene.

The sulfuric acid solution emerging from the bottom of the vent drum 23, known as "rich acid" is passed to a regenerator 25 by means of a pump 27. The tertiary butyl alcohol dissolved in the sulfuric acid is regenerated to isobutylene through the application of heat. As shown in the drawing, this is effected by the addition of steam to the bottom of the regenerator 25. The isobutylene leaves the regenerator by means of line 28 and is subjected to further treatment, e.g. a caustic wash and a water wash and is then admitted to an isobutylene storage tank (not shown).

The diluted acid from which the tertiary butyl alcohol has been removed, known as spent acid, is passed to an acid reconcentrator 29. The reconcentrated acid leaving the reconcentrator has sufficient water or fresh concentrated acid added thereto to bring it to the required concentration, and such acid is then stored in acid storage tank 20.

As described hereinabove, the reaction between the sulfuric acid and the $C_4$ hydrocarbons occurs at a higher temperature in the first stage reactor 14 than in the second stage reactor 22. In the customary commercial application of this process, the first stage reactor 14 may conveniently be operated at a temperature of about 85° F. (about 29° C.) and at a pressure of about 125 p.s.i.g. (about 9.5 atmospheres). These reaction conditions yield a lower or acid phase in the first stage settler tank 16 containing about 1.25 moles of isobutylene per mole of 100% sulfuric acid. On the other hand, the temperature of the second stage reactor 22 is maintained at about 60° F. (about 15° C.) and at about the same pressure. These reaction conditions result in the lower or acid phase in the second stage settler tank 13 containing about 0.40 mole of isobutylene per mole of 100% sulfuric acid.

The sulfuric acid added to the system at pump 19, i.e. the acid contained in the acid storage tank 20, is conventionally about 65% by weight sulfuric acid.

In the past, it has been considered that the vent drum should be operated at atmospheric pressure and at a temperature of about 125–130° F. (about 51–55° C.). When operating the vent drum at the optimum conventional temperature range of about 125–130° F. (about 51–55° C.), not only is excessive foaming encountered, but also substantial amounts of impurities, such as for example, n-butylenes remain in the rich acid leaving the vent drum. Such impurities, of course, remain with the isobutylene when the latter is regenerated from the sulfuric acid solution of tertiary butyl alcohol, and are known to exert a deleterious effect on subsequent usage of the so-formed isobutylene in various polymerization reactions.

The problem of excessive foaming has, in the past, been approached with the idea of adding defoamant to the vent drum. In practice, such defoamant has been tertiary butyl alcohol, added as a spray to the top of the drum. However, it was found that the use of an amount of tertiary butyl alcohol sufficient to reduce foaming resulted in a less pure isobutylene product. Thus, the undesirable n-butylene impurities are soluble in the tertiary butyl alcohol to such an extent that, instead of being flashed off and removed from the vent drum, undesirably large amounts of such impurities rising through the spray of alcohol would be dissolved in the tertiary butyl alcohol, and thereby returned to the sulfuric acid. When the sulfuric acid is subsequently treated in the regenerator, such dissolved n-butylenes would, of course, be present in the regenerated isobutylene stream.

It is the purpose of the present invention to disclose an improved process for the operation of the vent drum which contains the sulfuric acid solution of tertiary butyl alcohol, together with other dissolved and entrained gaseous hydrocarbon impurities.

It is a further object of this invention to disclose a process for the operation of such vent drum, which process serves to remove as much of the undesirable hydrocarbons as possible from the vent drum contents so that a higher purity isobutylene product may be obtained from the regenerator.

These and other objects of the present invention are achieved in the process of selectively extracting isobutylene from a mixture of $C_4$ hydrocarbons comprising olefins and paraffins in addition to the isobutylene by reacting said hydrocarbon mixture with an aqueous solution of sulfuric acid whereby to convert the isobutylene to tertiary butyl alcohol soluble in said aqueous sulfuric acid, separating said sulfuric acid solution from said hydrocarbons and regenerating the tertiary butyl alcohol in the sulfuric acid solution to isobutylene, by the improvement which comprises: effecting the extraction with sulfuric acid reconcentrated by vacuum distillation i.e. having a maximum of 2.0% by weight of non-aqueous impurities therein and passing such sulfuric acid solution of the tertiary butyl alcohol also containing physically entrained and dissolved hydrocarbon impurities to a venting zone maintained at a temperature of 135–150° F. (about 57–66° C.) prior to the regeneration of said isobutylene. Thus, it has been found that the operation of the vent drum at temperatures of about 135–150° F. preferably about 145–150° F. (about 62–66° C.), in conjunction with the use of an extractant sulfuric acid of a specified maximum content of non-aqueous impurities, results, surprisingly in the overhead hydrocarbons leaving the vent drum being substantially unchanged in composition over that which resulted when the conditions heretofore contemplated were used. Normally, it could be expected that operation of the vent drum at temperatures about 5–25° F. (about 2.8–13.9° C.) higher than the conventionally accepted temperature of 125–130° F. (about 51 to about 55° C.) would result in a net increase in the volume of gases flashed off. This increase is obtained in practice and was found to be about 10% by volume when the temperature is raised from 142 to 146° F. (i.e. from about 61 to about 63° C.). However, it was surprising that the composition of the vent drum overhead gas, i.e., the relative proportions of the various constituents remained relatively constant. This means that the absolute volume of rejected impurities was increased. Therefore, the isobutylene subsequently recovered from the rich acid in the regenerator contains less impurities than the isobutylene heretofore obtained.

It has previously been stated that, heretofore, it was necessary to add a defoamant to the vent drum, in order that the throughput of the system be increased, since the vent drum tended to foam excessively. It has now been found that the addition of such defoamant may be substantially reduced, or, in some cases, stopped completely when the extraction process is carried out, according to the present invention using an extractant acid which comprises reconcentrated sulfuric acid having a higher degree of purity than reconcentrated sulfuric acid heretofore used, in conjunction with the use of a higher vent drum temperature than heretofore suggested. The reconcentrated sulfuric acid which must be used in order to achieve the advantages of the present invention must contain less than 2.0% by weight, and preferably less than about 1.0% by weight of normal non-aqueous deleterious impurities (e.g. carbon). Use of such acid in the extraction step permits economic operation of the vent drum at higher temperatures with the unobvious advantages discovered by the present inventors. In addition the increased foaming expected to result from such higher temperatures surprisingly does not occur, and hence the tertiary butyl alcohol defoamant may be reduced in amount or may be omitted completely. This, too, results in a higher purity of the isobutylene ultimately recovered from the regenerator. It is believed that this unique unexpected cooperation between the vent drum temperatures on the one hand and the purity of the extractant acid on the other is not a phenomena which could be predicted from the theory of the extraction reaction. Further, it is believed that such unique co-operation displays a synergism which would not be expected to result.

While it is not desired to limit the present invention to any particular manner of obtaining the reconcentrated sulfuric acid, it has been found that a vacuum distillation gives especially good results. Vacuum distillation permits reconcentration at much lower temperatures, and this is believed to contribute to the fact that the reconcentrated sulfuric acid contains less non-aqueous deleterious impurities than acid obtained by ordinary atmospheric reconcentration. The vacuum distillation may satisfactorily be effected using four cell concentrators wherein the acid to be reconcentrated is heated to a higher temperature in each consecutive concentrator cell as it flows from one cell to the next cell. The vacuum is suitably obtained by means of a barometric condenser and a steam ejector. The resulting reconcentrated sulfuric acid has been found to be sufficiently free of non-aqueous impurities to result when used in the present invention, in the attaining of the unobvious results of this invention.

In the practice of the present invention, the temperature of the vent drum must, of course, be controlled so that it remains at the required point to give the results desired. Such temperature may conveniently be adjusted and controlled by heating the acid exract leaving the first stage settler tank 16 by flow through heat exchangers. Alternatively, the acid extract may be heated by directly injecting a heat-supplying gas, such as, for example, steam into the acid stream either before or after such stream enters the vent drum. As shown in the drawing, such temperature regulation has generally been effected by injecting steam into the acid stream shortly before such stream enters the vent drum. Thus the correct amount of steam, conveniently 150# steam, is injected into the flowing stream of sulfuric acid containing the dissolved tertiary butyl alcohol, as well as entrained and dissolved hydrocarbon impurities after the acid emerges from the first stage settler tank 16. In accordance with the present invention, the steam flow is regulated so as to maintain the vent drum temperature to between about 135–150° F. (about 57–66° C.), preferably to between about 145–150° F. (about 63–66° C.).

The following commercial plant scale operation of the extraction system is given to illustrate the present invention and to compare the extraction operation using conditions within the scope of the invention and outside the scope of the invention.

The extraction process outlined in the description of the flow sheet was carried out with the temperature of the vent drum being varied between 135 and 146° F. The $C_4$ feed, herein termed "I.P.S. feed," was fed through the system at a flow rate of about 59,157 lbs./hour. The first stage reactor was operated at a temperature of 80° F. (about 27° C.) and at a pressure of 125 p.s.i.g. (about 9.5 atmospheres). The second stage reactor was operated at a temperature of about 60° F. (about 16° C.) and at about the same pressure as the first stage reactor. The concentration of fresh sulfuric acid admitted to the second stage reactor was 61.5 percent by weight $H_2SO_4$ and contained about 0.7% by weight of any non-aqueous impurities. In the process, the rate of throughput of $C_4$ hydrocarbons through line 24, herein known as "I.P.S. spent" was about 49,091 lbs./hour. The rate of throughput of n-butylenes and other $C_4$ hydrocarbons through line 26, herein known as "vent drum overhead" was about 1060 lbs./hour. The rate of throughput of the isobutylene from the regenerator through line 28, herein known as "isobutylene" was 8,680 lbs./hour.

The following tables show the composition of the I.P.S. feed, the vent drum overhead, and the isobutylene when the vent drum was operated at various temperatures.

*Table I.—I.P.S. feed*

| Component (in percent by weight) | Vent drum Temperature | | |
|---|---|---|---|
| | 135–140° F. (about 57–60° C.) | 142° F. (about 61° C.) | 146° F. (about 63° C.) |
| $C_3$ hydrocarbons | 0.9 | 3.4 | 2.5 |
| butanes | 46.5 | 45.3 | 46.2 |
| isobutylene | 18.5 | 21.1 | 22.1 |
| n-butylene | 32.3 | 29.5 | 28.7 |
| butadiene | | 0.4 | trace |
| $C_4$ and heavier hydrocarbons | 1.8 | 0.3 | 0.5 |

*Table II.—Vent drum overhead*

| Component (in percent by weight) | Vent drum Temperature | | |
|---|---|---|---|
| | 135–140° F. (about 57–60° C.) | 142° F. (about 61° C.) | 146° F. (about 63° C.) |
| $C_3$ hydrocarbons | | 2.0 | 1.6 |
| butanes | 31.1 | 29.0 | 28.0 |
| isobutylene | 35.0 | 39.0 | 39.2 |
| n-butylene | 31.5 | 28.4 | 29.6 |
| butadiene | 0.7 | 1.3 | 1.3 |
| $C_4$ and heavier hydrocarbons | 1.7 | 0.3 | 0.3 |

*Table III.—Isobutylene*

| Components (in percent by weight) | Vent drum Temperature | | | |
|---|---|---|---|---|
| | 120–130° F. (about 49–54° C.) | 135–140° F. (about 57–60° C.) | 142° F. (about 61° C.) | 146° F. (about 63° C.) |
| $C_3$ hydrocarbons | | | | |
| butanes | 0.4 | 0.3 | 0.4 | 0.2 | 0.4 |
| isobutylene | 98.2 | 98.9 | 98.9 | 99.1 | 99.3 |
| n-butylene | 1.0 | 0.7 | 0.66 | 0.70 | 0.3 |
| butadiene | 0.1 | 0.1 | | | |
| $C_4$ and heavier hydrocarbons | 2.2 | 3.6 | 2.9 | 3.5 | 3.1 |

The above tables clearly show the advantageous unexpected results of the process according to the present invention. Thus Table II clearly shows that an increase in the temperature of the vent drum from 135° F. (about 57° C.) to 146° F. (about 63° C.) did not significantly change the relative proportions of the constituents of the vent drum overhead. Further, Table III clearly shows that the isobutylene extracted by this process has a purity greater than 98.9% by weight. It is well known that the isobutylene heretofore extracted using sulfuric has ranged in purity below about 98.5% by weight.

The isobutylene thus produced was next converted to butyl rubber in the conventional way. In this process, isobutylene and isoprene are dissolved in methyl chloride and contacted with aluminum chloride in an agitated reactor at a temperature of about −145° F. The aluminum chloride, which is in the form of a dilute solution in more methyl chloride, is added to the reactor and serves to catalyze the polymerization reaction between the two unsaturated hydrocarbons. The resulting polymer is an elastomer normally containing from 95–99 weight percent isobutylene and 1–5 weight percent isoprene and is widely used in the manufacture of air retaining liners for automobile tires because of its imperviousness to air. Maximum production obtainable using isobutylene of purity less than 98.5 weight percent was between 65.9–67.6 tons per day whereas a production of between 83.1–84.1 tons per day was realized using isobutylene having a purity higher than 99.0 weight percent.

What we claim is:

1. In the process of selectively extracting isobutylene from a mixture of $C_4$ hydrocarbons comprising olefins and paraffins in addition to the isobutylene by reacting said hydrocarbon mixture with an aqueous solution of sulfuric acid whereby to convert the isobutylene to tertiary butyl alcohol soluble in said aqueous sulfuric acid, separating said sulfuric acid solution from said hydrocarbon and regenerating the tertiary butyl alcohol in the sulfuric acid solution to isobutylene, the improvement which comprises: effecting the extraction with sulfuric acid reconcentrated by vacuum distillation and having a maximum of 2.0% by weight of non-aqueous impurities therein and passing such sulfuric acid solution of the tertiary butyl alcohol also containing physically entrained and dissolved hydrocarbon impurities to a venting zone maintained at a temperature of 135–150° F. prior to the regeneration of said isobutylene.

2. In the multi-stage process for selectively extracting isobutylene from a predominantly $C_4$ hydrocarbon feed stream, such stream comprising olefins and paraffins in addition to said isobutylene by contacting said $C_4$ hydrocarbon feed stream in countercurrent extraction in a first stage with sulfuric acid containing dissolved tertiary butyl alcohol resulting from the reaction of said sulfuric acid with the isobutylene present in said $C_4$ hydrocarbon stream in order to dissolve selectively, in the form of tertiary butyl alcohol, the major portion of the isobutylene contained in said $C_4$ hydrocarbon stream, separating the solution of said tertiary butyl alcohol in said sulfuric acid from the undissolved $C_4$ hydrocarbons, contacting said undissolved $C_4$ hydrocarbons in second stage with fresh aqueous sulfuric acid in order selectively to dissolve, in the form of tertiary butyl alcohol, the remaining portion of the isobutylene contained in said $C_4$ hydrocarbon stream, and recycling the solution of said tertiary butyl alcohol in said sulfuric acid extractant from the second stage to the first stage for use therein as the extractant medium for dissolving in the form of tertiary butyl alcohol, further amounts of isobutylene, passing the acid extract through a venting zone maintained at temperatures sufficient to reject undesirable impurities in the form of normal butanes and normal butylenes, then subjecting the acid extract to an increase in temperature accompanied by dilution whereby to convert said dissolved tertiary butyl alcohol back to isobutylene, the improvement which comprises: effecting the extraction in the second stage with fresh aqueous sulfuric acid reconcentrated by vacuum distillation and having a maximum of 2.0% by weight of non-aqueous impurities therein and passing such sulfuric acid solution of the tertiary butyl alcohol also containing physically entrained and dissolved hydrocarbon impurities to a venting zone maintained at a temperature of 135–150° F. prior to the regeneration of said isobutylene.

3. In the multi-stage process for selectively extracting isobutylene from a predominantly $C_4$ hydrocarbon stream, such stream comprising olefins and paraffins in addition to said isobutylene by contacting said $C_4$ hydrocarbon feed stream in counter-current extraction in a first stage, at a temperature of 75–95° F. with sulfuric acid containing dissolved tertiary butyl alcohol resulting from the reaction of said sulfuric acid with the isobutylene present in said $C_4$ hydrocarbon stream, in order selectively to dissolve, in the form of tertiary butyl alcohol, the major portion of the isobutylene contained in said $C_4$ hydrocarbon stream, separating the solution of said tertiary butyl alcohol in said sulfuric acid from the undissolved $C_4$ hydrocarbons, contacting said undissolved $C_4$ hydrocarbon at a second stage, at a temperature of 55–70° F. with fresh aqueous sulfuric acid containing 60.0–62.5% by weight $H_2SO_4$ in order selectively to dissolve, in the form of tertiary butyl alcohol, the remaining portion of the isobutylene contained in said $C_4$ hydrocarbon stream, and recycling the solution of said tertiary butyl alcohol in said sulfuric acid from the second stage to the first stage for use therein as the extractant medium for dissolving, in the form of tertiary butyl alcohol further amounts of isobutylene, passing the acid extracts through a venting zone maintained at a temperature sufficient to reject undesirable impurities in the form of normal butanes and normal butylenes, and then subjecting the acid extract to an increase in temperature accompanied by dilution whereby to convert said dissolved tertiary butyl alcohol back to isobutylene, the improvement which comprises: effecting the extraction in the second stage with fresh aqueous sulfuric acid reconcentrated by vacuum distillation and having a maximum of 2.0% by weight of non-aqueous impurities therein and passing said sulfuric acid solution of the tertiary butyl alcohol also containing physically entrained and dissolved hydrocarbon impurities to a venting zone maintained at a temperature of 135–150° F. prior to the regeneration of said isobutylene.

4. The process of claim 2 wherein the temperature of the venting zone is maintained between 145 and 150° F.

5. The process of claim 3 wherein the temperature of the venting zone is maintained between 145 and 150° F.

6. The process of claim 5 wherein the temperature of the first stage reaction zone is maintained at about 80° F. and the temperature of the second stage reaction zone is maintained at about 60° F., the pressure in the second stage reaction zone is maintained at about 125 p.s.i.g. and the pressure in the first stage reaction zone is maintained from about 1 to 30 p.s.i.g. higher than the pressure in the second stage reaction zone.

7. The process of claim 4 wherein the fresh sulfuric acid entering the second stage reaction zone contains a maximum of about 1.0% by weight of non-aqueous impurities therein.

References Cited in the file of this patent
UNITED STATES PATENTS
2,456,260   Draeger _____ Dec. 14, 1948

UNITED STATES PATENT OFFICE
CERTIFICATION OF CORRECTION

November 22, 1960

Patent No. 2,961,472

Donald Herbert Welch et al.

It is hereby certified that error appears in the above numbered patent requiring correction and that the said Letters Patent should read as corrected below.

In the drawing, line 24 should be shown as going to -- To spent C4 Recovery and Storage -- instead of "To spent C Recovery and Storage", and line 26 should be shown as going to -- To n-Butylene Scrubber and C4 Feed Storage -- instead of "To n-Butylene Scrubber and C Feed Storage"; column 6, line 20, Table I, line 34, Table II, and line 47, Table III, for "$C_4$", each occurrence, read -- $C_5$ --.

Signed and sealed this 20th day of June 1961.

(SEAL)
Attest:

ERNEST W. SWIDER
Attesting Officer

DAVID L. LADD
Commissioner of Patents